United States Patent [19]

Newman

[11] Patent Number: 5,655,169

[45] Date of Patent: Aug. 5, 1997

[54] BRAKE POINT FILM METERING

[75] Inventor: Peter Austin Newman, Pittsford, N.Y.

[73] Assignee: Eastman Kodak Company, Rochester, N.Y.

[21] Appl. No.: 456,442

[22] Filed: Jun. 1, 1995

[51] Int. Cl.$^6$ .................................................. G03B 1/00
[52] U.S. Cl. .................................................. 396/395
[58] Field of Search ............................ 354/173.11, 217, 354/218, 213, 215; 396/395, 406, 409

[56] References Cited

U.S. PATENT DOCUMENTS

| | | | |
|---|---|---|---|
| 4,431,292 | 2/1984 | Takahashi | 354/173.11 |
| 4,474,442 | 10/1984 | Shiozawa et al. | 354/173.11 |
| 4,632,530 | 12/1986 | Iwata et al. | 354/173.11 |
| 4,714,946 | 12/1987 | Bajgert et al. | 355/75 |
| 4,866,477 | 9/1989 | Barry et al. | 355/55 |
| 4,878,077 | 10/1989 | Maeno et al. | 354/400 |
| 4,996,549 | 2/1991 | Yamaguchi | 354/173.11 |
| 5,107,127 | 4/1992 | Stevens | 250/548 |
| 5,210,562 | 5/1993 | Miyazawa | 354/400 |
| 5,311,228 | 5/1994 | Stoneham et al. | 354/106 |
| 5,313,236 | 5/1994 | Izukawa | 354/106 |
| 5,323,198 | 6/1994 | Tabata et al. | 354/173.1 |
| 5,345,286 | 9/1994 | Stiehler | 354/173.1 |
| 5,349,406 | 9/1994 | Johnson et al. | 354/173.1 |
| 5,481,331 | 1/1996 | Cocca | 354/106 |

*Primary Examiner*—Safet Metjahic
*Assistant Examiner*—Christopher E. Mahoney
*Attorney, Agent, or Firm*—Charles E. Snee, III; David A. Howley

[57] ABSTRACT

Film winding between exposures in a photographic camera is interrupted and/or braked as a function of film velocity. The camera uses velocity in a control mechanism that stops the winding motor as a function of the velocity in response to detection of a film perforation. The function acts on a time interval between sensing a perforation and stopping the motor or applying a brake. The perforation detector and the velocity sensor use a single sensing element that generates first and second signals at the respective leading and trailing edges of a perforation. The time interval between the first and second signals is indicative of film velocity, and is used to determine the stopping function preferably in accordance with a predetermined look-up table. The control then selects an appropriate time interval between sensing a respective one of the perforations and stopping said motor. A brake also may be applied for stopping film movement, and the control applies the brake as a function of the velocity.

7 Claims, 6 Drawing Sheets

BRAKE POINT FILM METERING

DESCRIPTION

1. Field of Invention

The invention relates to photography, and more specifically to cameras that include control mechanisms for sequentially advancing respective frames of photographic film into an exposure position.

2. Background of the Invention

Photographic cameras typically include mechanisms for advancing film intermittently from a supply chamber through an exposure position into a take-up chamber. Film movement is metered to sequentially advance sections of the film, called frames, into the proper position for exposure. The mechanism then restrains further movement of the film until an exposure is completed and the mechanism is operated again to advance the next successive frame into the exposure position.

Most photographic film includes perforations along one or both edges. Many cameras use the perforations to drive the film intermittently from the supply chamber through the exposure position and into the take-up chamber. Sprockets, gears or pawls engage the perforations and move the film in an advancing direction. Slack on the supply side is removed by frictional resistance, while slack on the take-up side is removed with a tendency drive. The perforations may also be used for metering movement of the film, either by counting perforations or sensing the position of an individual perforation. Such mechanisms that advance and meter the film through the perforations can provide accurate positioning of the exposure frames in the desired position, but they are relatively expensive. Numerous parts and complicated mechanisms are required to accomplish the intended result, particularly in automated self-winding cameras.

Other cameras use spools in the supply and take-up chambers for advancing the film. The film is attached to the spool, and is advanced by rotating the spool, accumulating successive convolutions and thereby pulling the film across the exposure position. This approach is simple, with relatively few parts, but is not noted for accuracy.

Iwata U.S. Pat. No. 4,632,530, issued Dec. 30, 1986, discloses an example of the last-mentioned type in an automated, self-winding camera. An electric motor advances the film by rotating a spool. Perforations in the film are sensed and counted by an optical sensor that forms part of a control mechanism. The control mechanism interrupts and electrically brakes the motor drive after a predetermined number of the perforations is detected. Again, the approach is relatively simple, but it is difficult in such a device to position each and every film frame in the proper exposure position. Electrical and mechanical inertia varies with camera use, and changes the film stopping position from one exposure frame to the next. Examples of mechanical variables include the size of the film roll and the position of the relevant frame in the roll. Electrical examples include battery strength and the number of other camera systems competing for the same electrical source.

SUMMARY OF THE INVENTION

The present invention is directed to overcoming one or more of the problems set forth above. Briefly summarized, according to one aspect of the invention, film winding between exposures in a photographic camera is interrupted and/or braked as a function of film velocity. The film includes frame markers, preferably perforations, and the camera uses a mark detector in a control mechanism including a velocity sensor. The control stops the motor as a function of the velocity in response to detection of a frame marker. The function variable preferably is a time interval between sensing a marker and stopping the motor and/or applying a brake.

According to more specific aspects of the invention, the mark or perforation detector and the velocity sensor use a single fixed sensing element that generates first and second signals at the respective leading and trailing edges of a mark or perforation. The time interval between the first and second signals is indicative of film velocity, and is used to determine the stopping function preferably in accordance with a predetermined look-up table. The control then selects an appropriate time interval between sensing a respective one of the marks or perforations and stopping the motor. Still more specifically, the camera includes a brake selectively applied to stop movement of the film, and the control applies the brake as a function of film velocity.

The invention provides a non-contact film metering mechanism that accurately positions film frames in a proper position for exposure. Variability in mechanical and electrical momentum is accounted for by determining film velocity and making adjustments according to the velocity. Film positioning is consistently accurate regardless of other variables such as battery power, concurrent energy demands, film roll size and the position of the frame on the roll.

These and other features and advantages of the invention will be more clearly understood and appreciated from a review of the following detailed description of the preferred embodiments and appended claims, and by reference to the accompanying drawings.

DETAILED DESCRIPTION OF THE INVENTION

Figure 1:
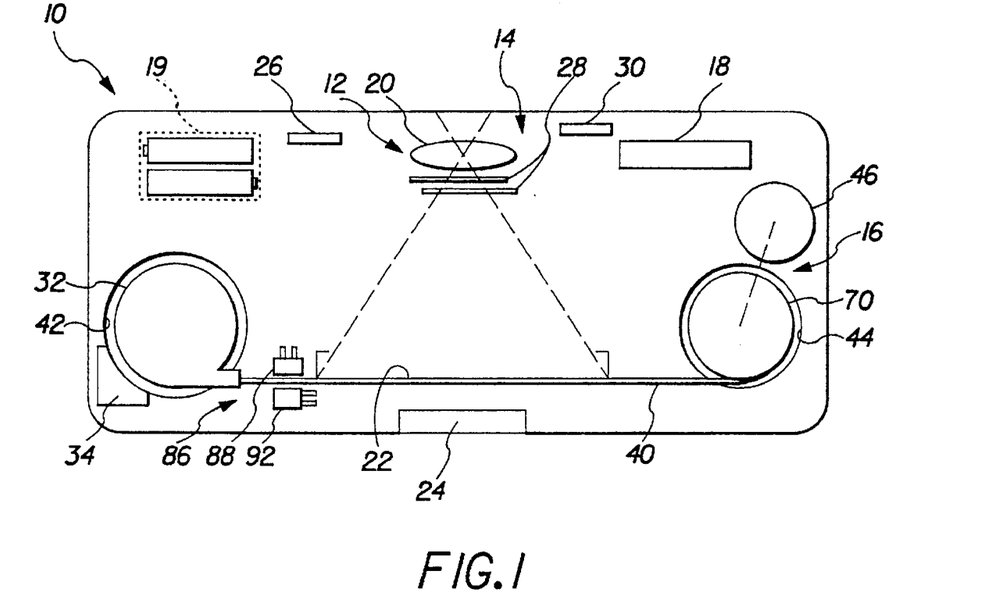
FIG. 1 is a schematic view of a camera including an autowinding mechanism and control for consistently positioning successive film frames in a proper exposure position in accordance with a preferred embodiment of the invention.
Figure 2:
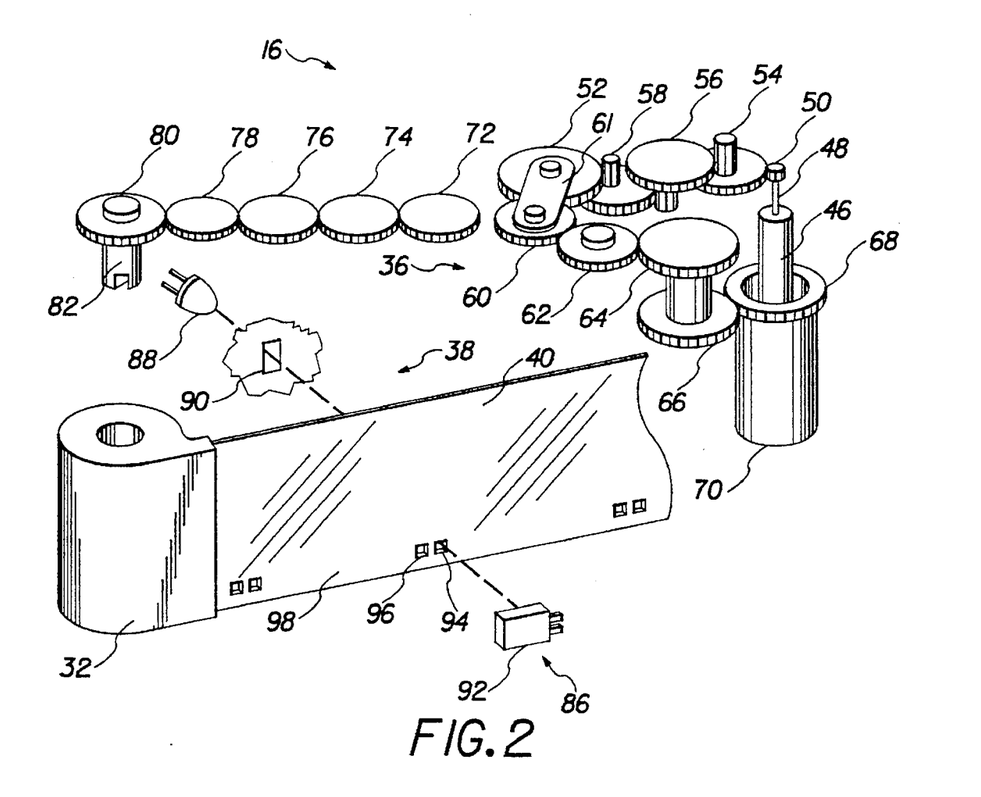
FIG. 2 is a perspective view showing more detail of the autowinding mechanism of FIG. 1.

Referring now to a preferred embodiment of the invention, and beginning with FIGS. 1 and 2, a camera 10 is depicted including an optical system 12, exposure mechanism 14, film advancing mechanism 16 and control 18. The system, mechanisms and control are powered by an electrical source depicted as one or more batteries 19.

Optical system 12 is a conventional design, available commercially, and includes one or more optical elements 20 for focusing an image of a photographic scene onto a plane in exposure position 22. The camera is pointed at the intended scene with the aid of viewfinder 24. An autoranging device 26 then adjusts the optical elements 20, properly focusing the image onto the exposure plane in position 22.

Figure 5:
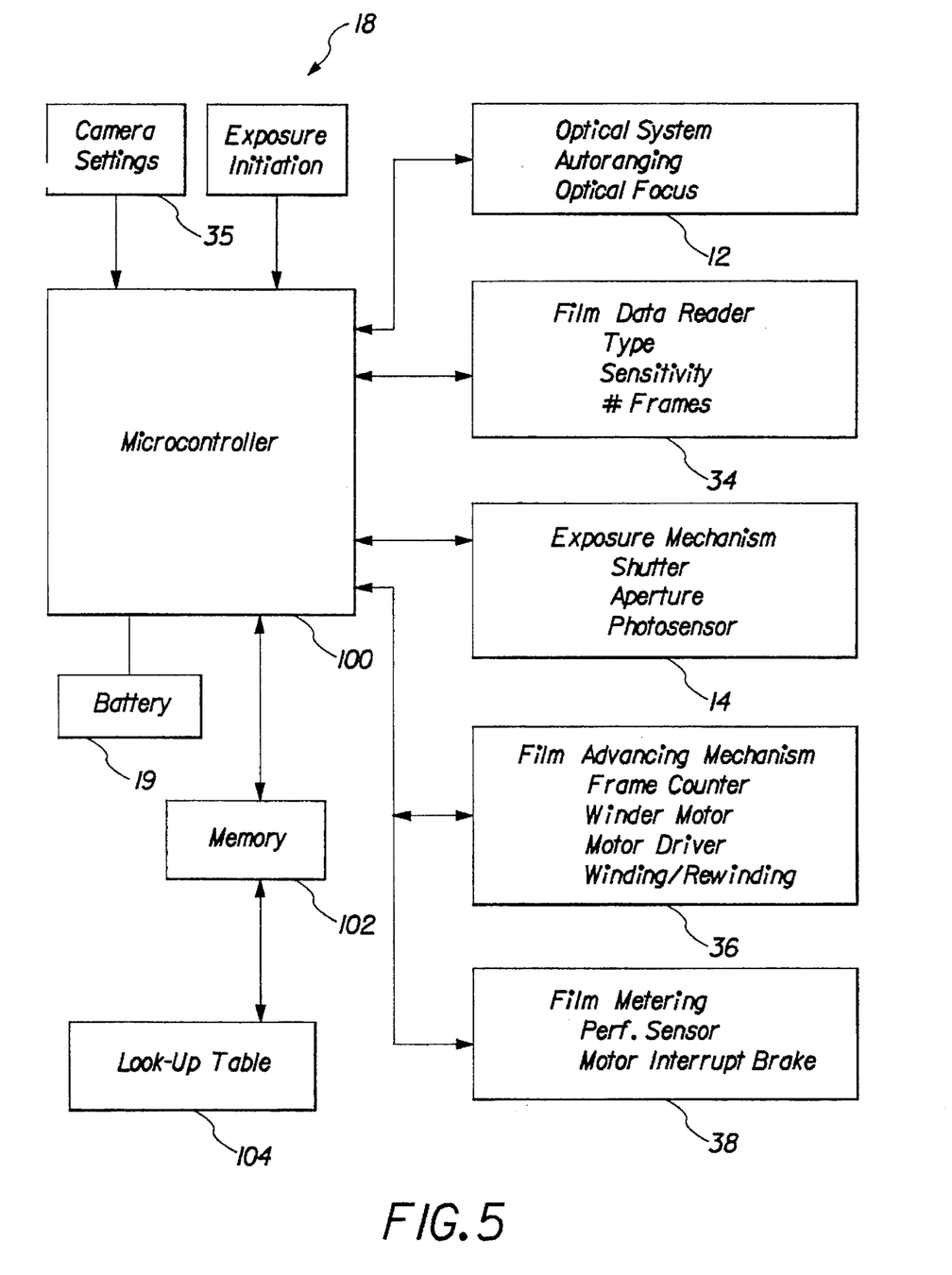
FIG. 5 is a schematic view of the control mechanism of the camera of FIG. 1.

Exposure mechanism 14 also is a commercially available design including a combined shutter and aperture 28 and a photosensor 30. The photosensor 30 provides information about scene light to control 18, which is used by the control to adjust the shutter speed and aperture size for a proper exposure. Other pertinent information is read from film cartridge 32, and provided to control 18, by a data or bar code reader 34. Film speed or sensitivity, for example, is read from the cartridge and used by the control 18 as one of the inputs for determining proper exposure settings. Other film and camera settings are input manually through appropriate features depicted at 35 in FIG. 5. Exposure initiation is completed manually through appropriate features depicted at 37 in FIG. 5.

Film advancing mechanism 16 includes a film transporting subsystem 36 (FIG. 2) and a film metering subsystem 38. The subsystems work together to advance the film 40 intermittently, one frame after another, from a supply chamber 42 (FIG. 1) through the exposure position 22 and into a take-up chamber 44.

The transporting subsystem 36 includes an electric motor 46 having an output shaft 48 and pinion 50 coupled to a sun gear 52 through a series of reduction gears 54, 56, and 58. The reduction gears reduce the drive speed of the motor 46 while increasing its torque. Sun gear 52, in turn, is coupled to a planetary gear 60 that is mounted on lever arm 61 for pivotal movement between first and second positions. The first position, shown in FIG. 2, winds the film into take-up chamber 44, while the second position rewinds the film into the supply chamber 42. In the winding position of the planetary gear 60, it engages a series of intermediate gears 62, 64, 66 and 68 that rotate a spool 70 in the take-up chamber 44. Film 40 is attached to the spool 70, so the film is wound onto the spool and accumulated there when the motor 46 is operated with planetary gear 60 in the winding position. When the planetary gear is moved to the rewinding position, it engages a second series of gears in a train 72, 74, 76, 78, and 80, that rewind the film back into the supply chamber 42. A fork 82 extending from gear 80 is keyed to a spool (not shown) in cartridge 32, so operation of the motor 46 through the rewinding gear train winds the film onto the cartridge spool. Motor 46 thus is driven in a forward direction for both winding or advancing the film from the cartridge and for rewinding or retracting the film into the cartridge.

The metering subsystem 38 comprises a perforation sensor 86 acting through control 18 for actuating a means for stopping the motor by interrupting power to motor 46 and reversing the power to brake the motor. Motor 46 is a DC motor, so power applied in the reversing direction acts to brake forward rotation of the motor. Reverse power is applied briefly, and then the motor terminals are shorted, to stop the motor without reversing its direction of rotation. Other electrical or mechanical braking methods might include a simple open circuit to the motor, shorting the motor terminals, or reversing the motor current either once or intermittently as a function of the measured velocity.

The perforation sensor 86 includes a source of illumination 88 positioned in-line with a slot 90 and photosensor 92.

Preferably the illumination source 88 is a light emitting diode (LED) that radiates in wavelengths at which film 40 is relatively insensitive. In any event, slot 90 and its surrounding camera structure limit any exposure of the film to a small strip outside the area exposed to scene images. Film 40 includes two perforations 94 and 96 along one edge 98 of the film in a predetermined position relative to each intended exposure frame. The illumination source 88 is aligned with the film edge 98. When the film perforations are advanced into a position adjacent slot 90, light from the source 88 passes through the perforations 94 and 96 and onto the photosensor 92. The photosensor produces an electric signal proportional to the sensed illumination, and this signal is used by control 18 to meter film movement, successively positioning each successive frame in the exposure position.

Of course other marks, such as density gradients, could be provided on the film for identifying the intended position of the exposure frames. Similarly, other types of sensors could be provided for sensing the frame markers, including sensors that employ reflected or transmitted energy. It will be apparent from the following description, however, that it is preferable the sensors are sufficiently discriminating to sense leading and trailing edges of the frame markers, and most such sensors will be non-contacting, electronic sensors.

Control 18 includes a microprocessor 100 (FIG. 5) and memory 102, including a look-up table 104, for receiving inputs from the various camera mechanisms, including those described above, and for controlling their operation according to the inputs and predetermined instructions. Control 18 also determines and stores changing information such as the date and time and the number of film frames previously exposed.

Referring now to FIGS. 3–6, further details are depicted in accordance with a preferred embodiment of the invention. Briefly summarized, the velocity of the film is determined by control 18, with input from perforation sensor 86, and this velocity is used for adjusting the film metering cycle as each respective exposure frame moves into the exposure position. The control 18 thus accounts for variables that change with or cause changes in the film velocity.

Figure 3:
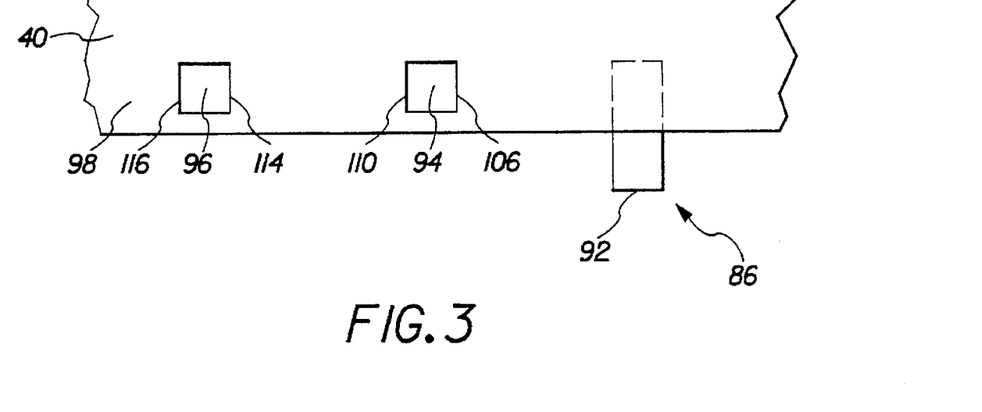
FIG. 3 is a plan view of a film strip for use in the camera of FIG. 1, depicting perforations in the film for metering movement of the film by the autowinding mechanism.

FIG. 3 represents a section of film 40 depicting a pair of perforations 94 and 96 associated with each respective exposure frame. For reasons that will soon be apparent, perforation 94 is referred to as an anticipation perforation, while perforation 96 is referred to as a metering perforation. Movement of the film 40 relative to fixed sensor 86 generates a series of electrical signals depicted in FIG. 4. When the leading edge 106 of perforation 94 moves into alignment between light source 88 and photosensor 92, light passes through the perforation, striking the sensor and generating an electrical transition depicted at 108. This signal continues until the trailing edge 110 of perforation 94 moves beyond the photosensor 92, at which point the signal returns at 112 to its original value. The cycle is repeated at the leading and trailing edges, 114 and 116, of perforation 96, producing a similar signal starting at 118 and ending at 120. Of course appropriate filters and signal processing can be used to sharpen the transitions, and to provide a signal that is an appropriate digital input for control 18.

Figure 4:
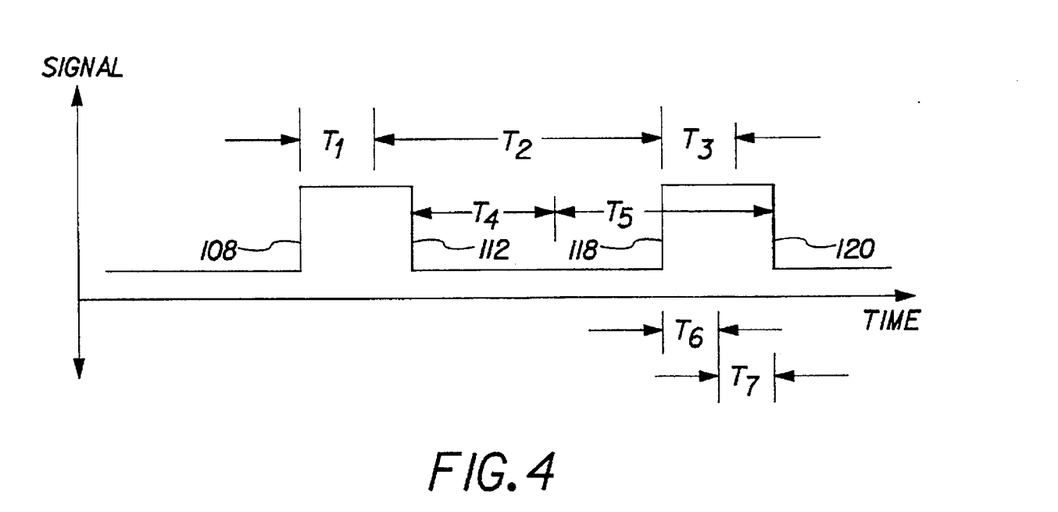
FIG. 4 is a schematic view representing electrical signals generated by a perforation sensor of the control mechanism of the FIG. 1 camera.

It should now be apparent that the time interval $T_1$ between transitions 108 and 112 is directly related to the velocity of the anticipation perforation 94 as it moves past the fixed perforation sensor 86. Similarly, time interval $T_2$ is directly related to the velocity of the film between perforations 94 and 96, and time interval $T_3$ is directly related to the velocity of the film as metering perforation 94 moves past sensor 86. This assumes, of course, that the film is continuously moving between the pertinent electrical transitions. Control 18 thus serves as a means for measuring intervals $T_1$, $T_2$ and $T_3$ in response to the output of sensor 86.

The preferred embodiment uses the time $T_1$ in control 18 for determining film velocity. Control 18 then refers to a look-up table 104 (FIG. 5) and retrieves a time interval $T_4$. Control 18 also serves as a means for determining the film velocity based on time interval $T_1$ and for determining the time interval $T_4$ until the means for stopping must be applied to stop the film, at the exposure position. Control 18 interrupts the motor drive at the end of interval $T_4$, and applies a reverse current brake to stop the motor. Control 18 further serves as a means for actuating the means for stopping. Momentum continues to move the film, however, until it finally stops at the end of time interval $T_5$.

Figure 6:
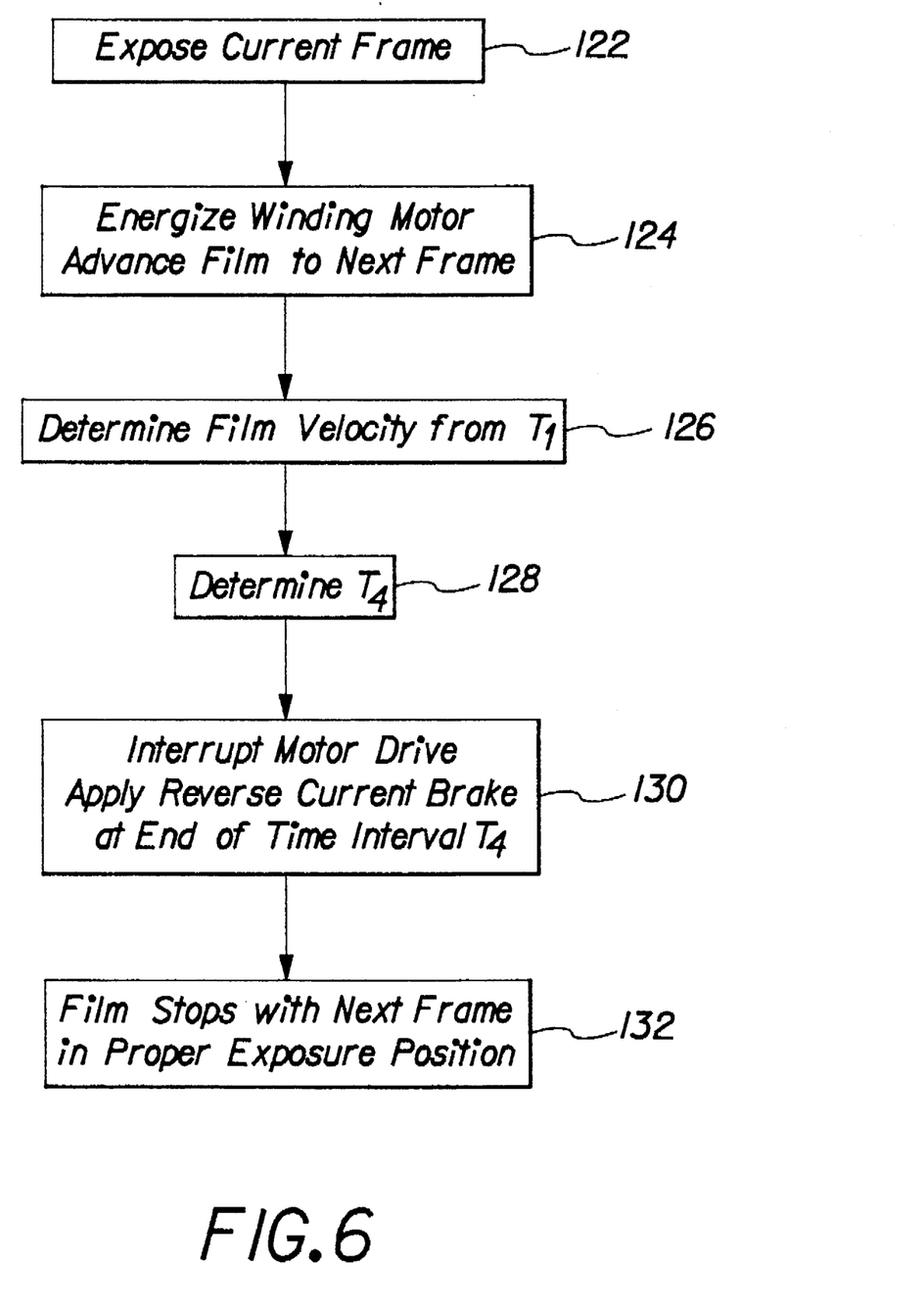
FIG. 6 is a flow diagram depicting the operation of the FIG. 1 camera according to the preferred embodiment.

FIG. 6 is a flow diagram depicting the steps and events just described. After one image is exposed (step 122), the film winding motor 46 is energized to advance the film 40 toward the take-up chamber 44 (step 124). When the anticipation perforation 94 passes the perforation sensor 86, the film velocity is determined from time interval $T_1$ (step 126). Control 18 then determines when to interrupt power to the winding motor 46 and apply an appropriate braking method to stop the motor (step 128). The brake method is applied at the end of time interval $T_4$ (step 130), and the film and motor stop at the end of time $T_5$ with the next film frame in the correct position for the next successive exposure (step 132). This process is repeated for each successive frame, determining and using different time intervals according to the velocity parameters associated with each respective frame.

Figure 7:
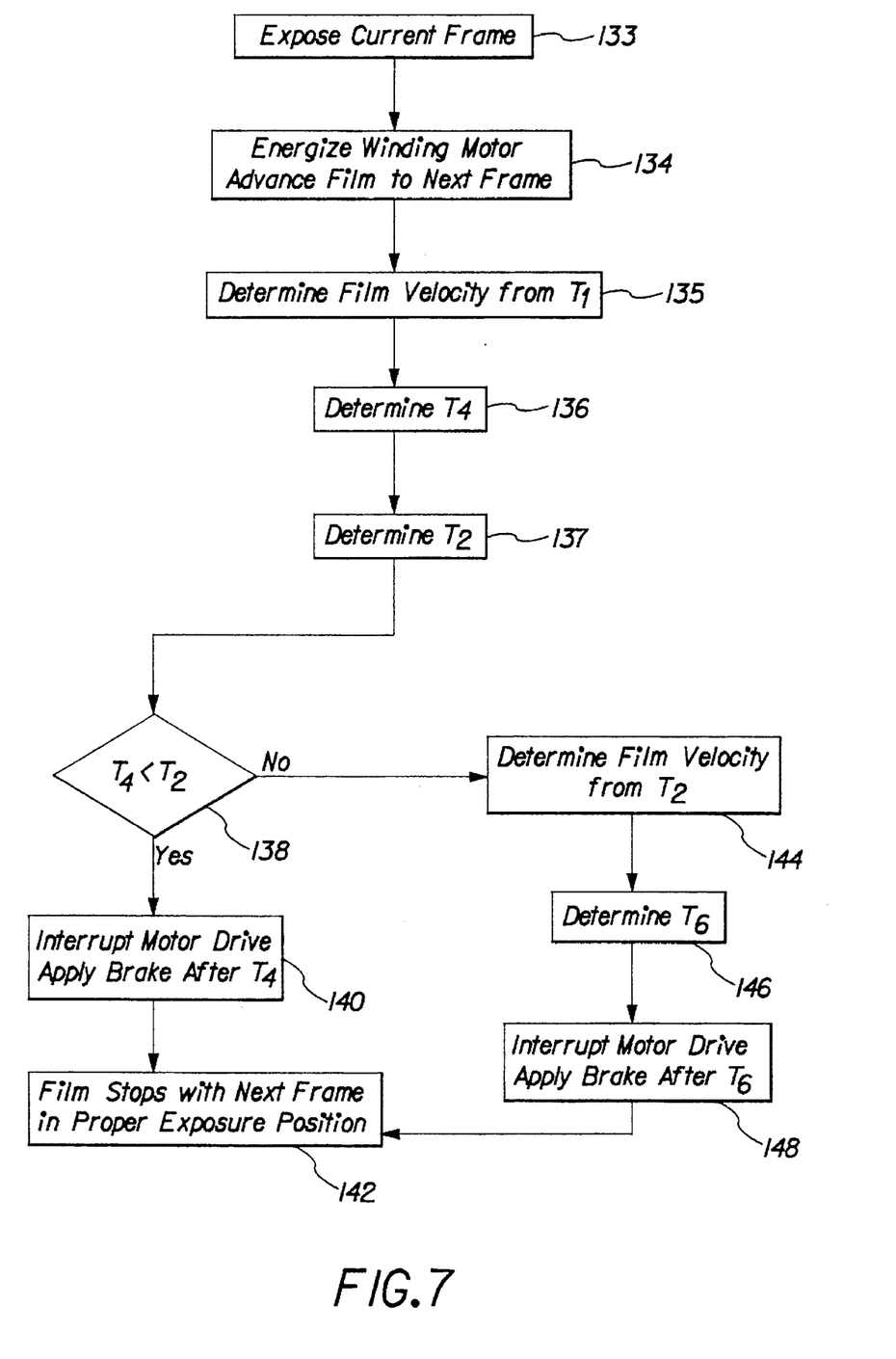
FIG. 7 is a flow diagram according to a first alternative embodiment of the invention.

An alternative embodiment of the invention is depicted in FIG. 7 that is similar to the preferred embodiment with an additional consideration depending on the relative values of $T_2$ and $T_4$. The first four steps, 133, 134, 135 and 136 are the same as the preferred embodiment. However, a decision is made at step 138. If $T_4<T_2$, the process continues through steps 140 and 142, again similar to the preferred embodiment. If $T_2<T_4$, however, the process follows steps 144, 146, 148 and 142, using $T_2$ to determine the film velocity and time to apply the brake.

Figure 8:
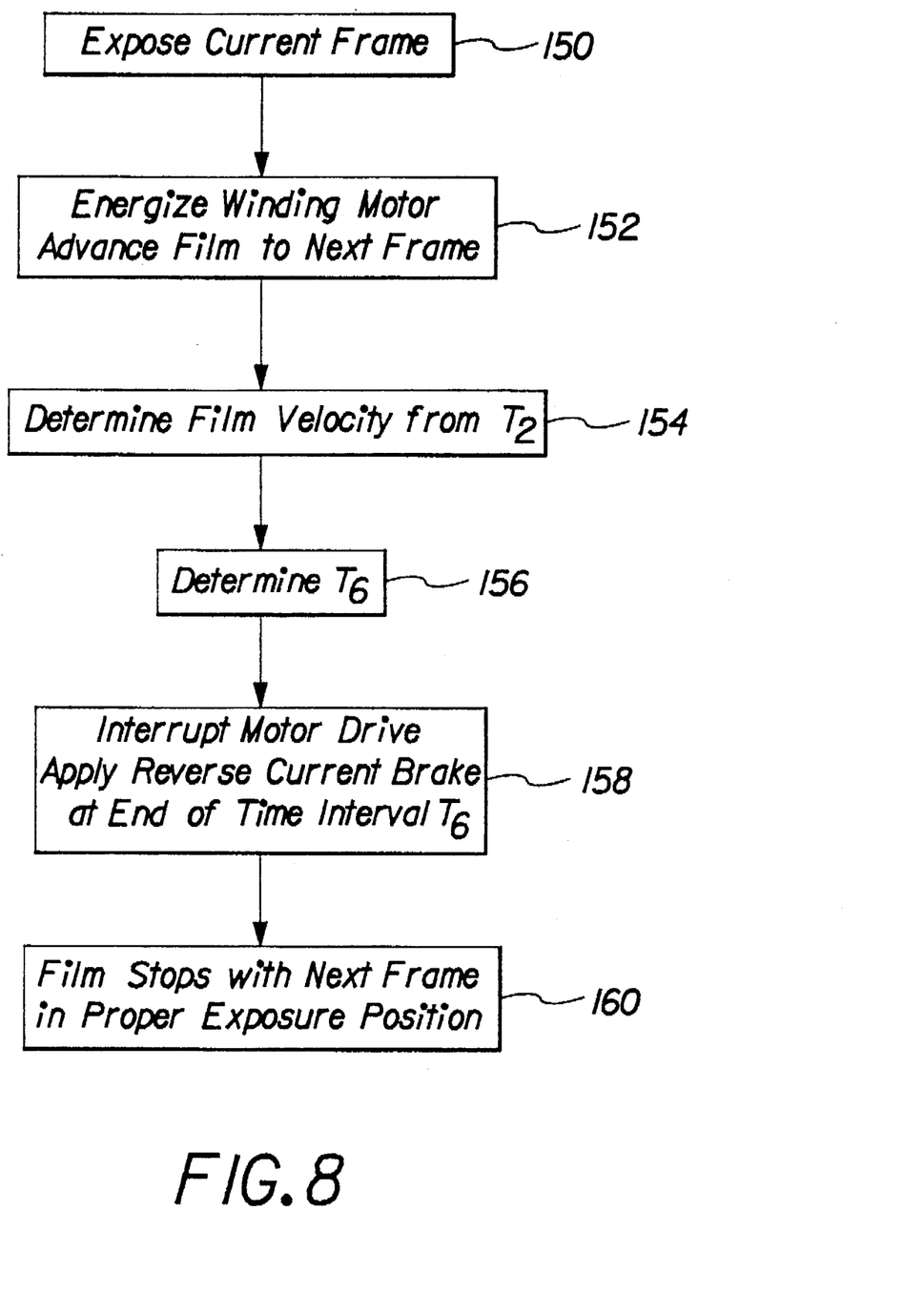
FIG. 8 is a flow diagram according to a second alternative embodiment of the invention.

FIG. 8 depicts a second alternative embodiment, based on the assumption that $T_4$ is always greater than $T_2$. The first two steps 150 and 152 are the same as the preferred embodiment. Film velocity is then determined using time $T_2$, time interval $T_6$ is determined from a look-up table, and the brake is applied at the end of time interval $T_6$, stopping film movement at the end of time interval $T_7$. These last steps are represented at 154, 156, 158 and 160.

It should now be apparent that the preferred and alternative embodiments provide improved film metering in a camera that advances the film by winding it onto a spool. Relatively few and inexpensive mechanisms are sufficient to provide accurate metering for each and every frame as the film is advanced sequentially from the supply to the take-up.

While the invention is described in connection with a preferred and alternative embodiments, other modifications and applications will occur to those skilled in the art. The claims should be interpreted to fairly cover all such modifications and applications within the true spirit and scope of the invention.

PARTS LIST

| Reference No. | Part |
|---|---|
| 10. | Camera. |
| 12. | Optical system. |
| 14. | Exposure mechanism. |
| 16. | Film advancing mechanism. |
| 18. | Control. |
| 19. | Batteries. |
| 20. | Optical elements. |
| 22. | Exposure position. |
| 24. | Viewfinder. |
| 26. | Autoranging device. |
| 28. | Shutter & aperture. |
| 30. | Photosensor. |
| 32. | Film cartridge. |
| 34. | Reader. |
| 35. | Input features. |
| 36. | Film transporting subsystem. |
| 37. | Exposure initiation |
| 38. | Film metering subsystem. |
| 40. | Film. |
| 42. | Supply chamber. |
| 44. | Take-up chamber. |
| 46. | Motor. |
| 48. | Output shaft. |
| 50. | Pinion. |
| 52. | Sun gear. |
| 120. | Electrical transition. |
| | $T_1, T_1, T_1, T_1, T_1$. Time intervals. |
| 122–160. | Method steps. |
| 54, 56 & 58. | Reduction gears. |
| 60. | Planetary gear. |
| 61. | Lever arm. |
| 62, 64, 66 & 68. | Winding gears. |
| 70. | Spool. |
| 72, 74, 76, 78 & 80. | Rewinding gears. |
| 82. | Fork. |
| 86. | Perforation sensor. |
| 88. | Illumination source. |
| 90. | Slot. |
| 92. | Photosensor. |
| 94. | Perforation. |
| 96. | Perforation. |
| 98. | Film edge. |
| 100. | Microprocessor. |
| 102. | Memory. |
| 104. | Look-up table. |
| 106. | Leading edge. |
| 108. | Electrical transition. |
| 110. | Trailing edge. |
| 112. | Electrical transition. |
| 114. | Leading edge. |
| 116. | Trailing edge. |
| 118. | Electrical transition. |

I claim:

1. In a camera including an advancing mechanism for sequentially moving photographic film relative to an exposure position, the advancing mechanism having a motor, the film defining a plurality of frame markers with leading and trailing edges, a marker sensor, means for stopping the motor, means responsive to the sensor for measuring a first time interval between passage of selected edges of the markers while the motor is advancing the film; and means for determining from the first time interval a velocity of the film; the improvement comprising:

a control including a look up table of film velocities and corresponding lime intervals until actuation of the means for stopping to stop the film at the exposure position, and means for referring to the look up table with the determined velocity of the film and retrieving from the look up table a further time interval until actuation of the means for stopping to stop the film at the exposure position; and means for actuating the means for stopping, after the further time interval.

2. A camera according to claim 1, wherein said sensor generates first and second signals at respective leading and trailing edges of a marker.

3. A camera for use with photographic film, the camera including a motor for advancing the film relative to an exposure position, means for stopping the motor, and a control for sensing frame markers on the film, determining a velocity of the film, and operating the motor and means for stopping to position sequential film frames in the exposure position; characterized in that:

the control includes a look up table of film velocities and corresponding time intervals until initiation of stopping of the motor to stop the film at the exposure position, and means for referring to the look up table with the determined velocity and retrieving from the look up table a first time interval between sensing a respective frame marker and initiating stopping of said motor.

4. A camera according to claim 3, wherein said control senses leading and trailing edges of said markers, produces first and second signals, respectively, at said leading and trailing edges, and determines said velocity from a second time interval between said first and second signals.

5. A method for advancing and stopping film in a photographic camera of a type including an advancing mechanism for sequentially moving photographic film relative to an exposure position, the advancing mechanism having a motor and a means for stopping the motor, and the film defining a plurality of frame markers with leading and trailing edges, the method comprising steps of:

while the motor is advancing the film, measuring a first time interval between passage of selected edges of the frame markers;

determining from the first time interval a velocity of the film;

referring to a look up table of film velocities and corresponding time intervals until actuation of the means for stopping to stop the film at the exposure position and, using the determined velocity of the film, retrieving from the look up table a further time interval until actuation of the means for stopping to stop the film at the exposure position in the camera; and after the further time interval, actuating the means for stopping to stop the film at the exposure position.

6. A method according to claim 5, wherein the selected edges are leading and trailing edges of a single marker.

7. A method according to claim 5, wherein the selected edges are a trailing edge of a first marker and a leading edge of a subsequent marker.

* * * * *